United States Patent [19]

Nagai

[11] Patent Number: 5,826,212
[45] Date of Patent: Oct. 20, 1998

[54] CURRENT-POSITION MAP AND THREE DIMENSIONAL GUIDING OBJECTS DISPLAYING DEVICE FOR VEHICLE

[75] Inventor: Takaaki Nagai, Wako, Japan

[73] Assignee: Honda Giken Kogyo Kabushiki Kaisha, Tokyo, Japan

[21] Appl. No.: 547,530

[22] Filed: Oct. 24, 1995

[30] Foreign Application Priority Data

Oct. 25, 1994 [JP] Japan .................................. 6-297783
Oct. 25, 1994 [JP] Japan .................................. 6-297784

[51] Int. Cl.$^6$ ...................... G06F 165/00; G08G 1/0969
[52] U.S. Cl. ..................... 701/208; 701/212; 340/990; 340/995; 348/51; 348/116; 382/154; 395/119
[58] Field of Search ............................. 364/449.1, 449.2, 364/449.3, 449.5, 449.8; 348/116, 118, 119, 42, 51, 59, 115; 382/154; 340/990, 995; 395/119, 125, 129, 135, 118

[56] References Cited

U.S. PATENT DOCUMENTS

| | | |
|---|---|---|
| 4,744,033 | 5/1988 | Ogawa et al. ........................... 364/443 |
| 4,896,210 | 1/1990 | Brokenshire et al. ..................... 348/51 |
| 4,959,641 | 9/1990 | Bass et al. ............................... 345/139 |
| 4,987,487 | 1/1991 | Ichinose et al. ........................... 348/59 |
| 5,264,964 | 11/1993 | Faris ......................................... 359/465 |
| 5,266,948 | 11/1993 | Matsumoto ............................. 340/995 |
| 5,293,163 | 3/1994 | Kakihara et al. ..................... 364/449.2 |
| 5,381,338 | 1/1995 | Wysocki et al. ..................... 364/449.1 |
| 5,539,399 | 7/1996 | Takahira et al. ........................ 340/990 |

FOREIGN PATENT DOCUMENTS 326917  5/1991  Japan .

*Primary Examiner*—Tan Q. Nguyen
*Attorney, Agent, or Firm*—Lyon & Lyon LLP

[57] ABSTRACT

A vehicle current-position displaying device which is capable of stereoscopically displaying a road map for indicating thereon a current location of the vehicle with an increased reality of the mapped situations. The device searches and indicates a current position of the vehicle on a road map which is stereoscopically displayed on a stereo-display screen by projecting the map image consisting of a right-viewpoint image and a left-viewpoint image.

5 Claims, 7 Drawing Sheets

| Display Elements | Classification | Coordinates |
|---|---|---|
| A | Multi-leveled Crossing 5902 | $(X_{a1}, Y_{a2}, Z_{a3})$ |
| B | Fire Station 276 | $(X_{b1}, Y_{b2}, Z_{b3})$ |
| C | School 229 | $(X_{c1}, Y_{c2}, Z_{c3})$ |
| D | Bridge 3947 | $(X_{d1}, Y_{d2}, Z_{d3})$ |
| E | Mountain 838 | $(X_{e1}, Y_{e2}, Z_{e3})$ |
| Roadway Network | | |
| x1 | National Highway No.16 | $(x1, y1, z1)$ |
| x2 | ″ | $(x2, y2, z2)$ |
| x3 | ″ | $(x3, y3, z3)$ |
|  | ″ | $(x4, y4, z4)$ |
| x1000 | Prefectural Highway No.24 | $(xn, yn, zn)$ |
| x1001 | ″ | $(xn+1, yn+1, zn+1)$ |
| x5102 | ○○ River | $(xm, ym, zm)$ |
| x5101 | ″ | $(xm+1, ym+1, zm+1)$ |

FIG. 8

| Multi-leveled Crossing | Crossing No. | Three-dimensional Constitutive Data |
|---|---|---|
| | 1 | (a1, a2, a3, a4, a5, a6, a7, a8) |
| | 2 | |
| | . | |
| Building | Building No. | Three-dimensional Constitutive Data |
| | 1 | (b1, b2, b3, b4, b5, b6, b7, b8) |
| | 2 | |
| | . | |
| Bridge | Bridge No. | Three-dimensional Constitutive Data |
| | 1 | (c1, c2, c3, c4, c5, c6, c7, c8) |
| | 2 | |
| | . | |
| Mountain | Mountain No. | Three-dimensional Constitutive Data |
| | 1 | (d1, d2, d3, d4, d5, d6, d7, d8) |
| | 2 | |
| | . | |

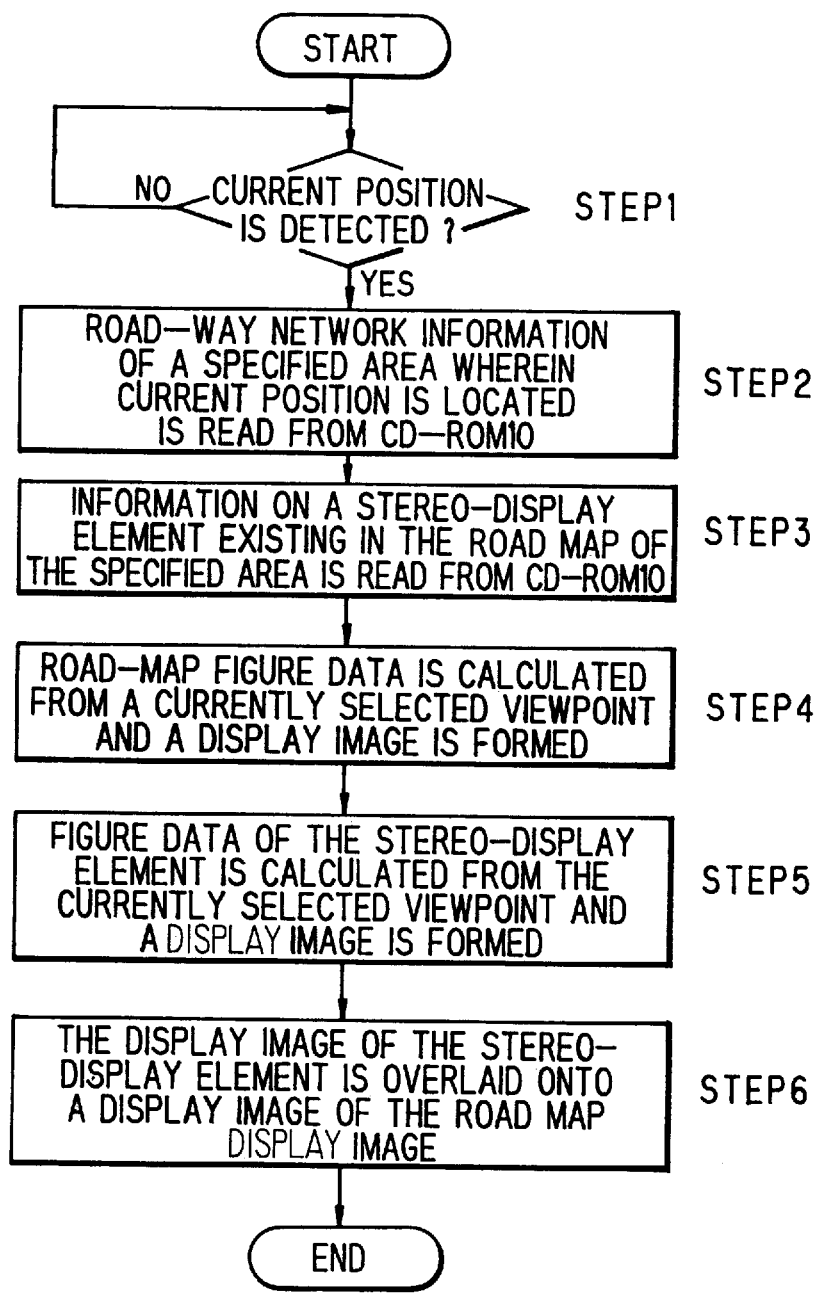

CURRENT-POSITION MAP AND THREE DIMENSIONAL GUIDING OBJECTS DISPLAYING DEVICE FOR VEHICLE

BACKGROUND OF THE INVENTION

The present invention relates to a current-position displaying device for use in a vehicle, which device is capable of displaying a current position of the vehicle on a road map indicated on a display screen.

Generally, a current-position displaying device of this type determines a current position of the vehicle on a road map on the basis of the position determined by position locating means such as a GPS (Global Positioning System), determines the running direction of the vehicle by a direction sensor and displays the current position (mark p) and the running direction (mark D) of the vehicle on the road map indicated on a display screen.

Japanese Laying-open patent No. 3-26917 discloses such a conventional displaying device that prepares a pseudo three-dimensional road image by using a two-dimensional perspective method and displays it on a road map indicated on a display screen.

The problems involved in the above-mentioned conventional methods are as follows:

If a road map presented as a two-dimensional image wherein the current position of the vehicle is indicated as shown in FIG. 3, the driver can not vividly conceive the location of the vehicle since the map is different from the actual roadway situation.

The pseudo-stereoscopic image of a roadway, which is obtainable by the perspective two-dimensional method, can not express an actual multi-leveled crossing thereon.

The road map desirably should include not only a roadway network but guiding objects (e.g., bridges and buildings) and topographic features (e.g., mountains and rivers), which are very important for the driver to accurately grasp where the vehicle is running. In other words, to obtain the road map conforming to actual roadway circumstances, it is necessary to stereoscopically display guiding objects and topographic features in addition to roadways on the display screen.

SUMMARY OF THE INVENTION

Accordingly, an object of the present invention is to provide a current-position displaying device for use in a vehicle, which device is capable of stereoscopically displaying a road map for indicating thereon the current position of the vehicle by projecting image information consisting of a left-viewpoint image and a right-viewpoint image onto a stereoscopic display screen for making the road map be adapted for the actual roadway situations.

Another object of the present invention is to provide a current-position display device for use in a vehicle, which device is capable of stereoscopically displaying a road map for indicating thereon the current position of the vehicle on the basis of map information including multi-leveled crossings, guiding objects and topographic features in addition to a roadway network in such a way that three-dimensional figures of stereo-display elements (i.e., multi-leveled crossings, guiding objects and topographic features) are displayed at respective specified positions on the roadway-network indicated on the display screen.

BRIEF DESCRIPTION OF DRAWINGS

FIG. 8 shows a table of data on stereo-display elements among constitutive elements of the road map shown in FIG. 6.

FIG. 12 is a flow chart of processing operations for preparing a display image by the displaying device of FIG. 5.

DESCRIPTION OF THE PREFERRED EMBODIMENTS

Figure 1:
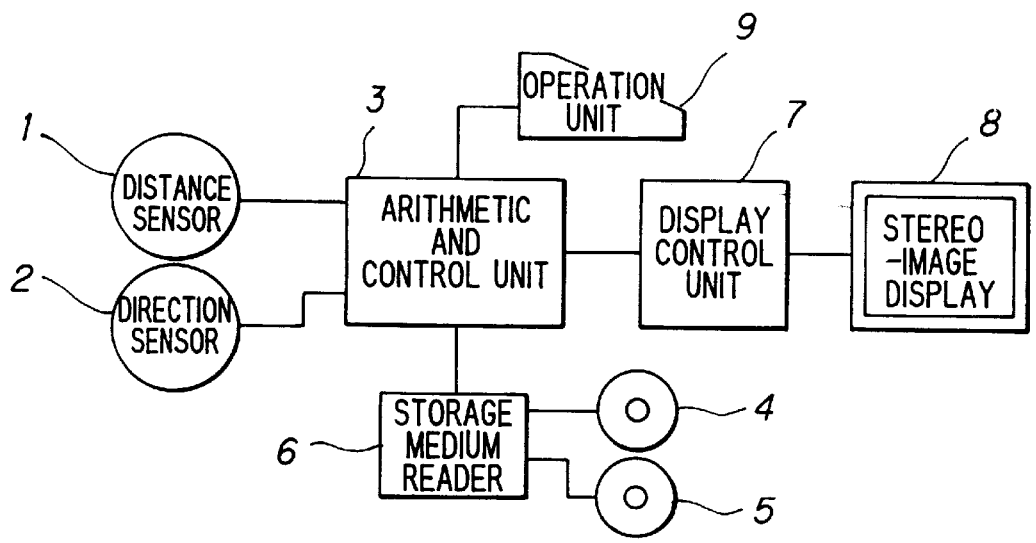
FIG. 1 is a block diagram showing a structure of a vehicle current-position displaying device embodying the present invention.

Referring to FIG. 1, there is shown a vehicle current-position displaying device embodying the present invention, which comprises: a distance sensor 1 for detecting a running distance of the vehicle, a direction sensor 2 for detecting a running direction of the vehicle; an arithmetic and control unit 3 that determines a current position of the vehicle to be indicated on a road map on a display screen by sequentially calculating X- and Y-coordinates of current vehicle position per unit running distance from the start point on the basis of a detected running distance and a detected variation of running direction and performs the control of the entire system; a roadway-network information storage medium (CD-ROM) 4 for storing digitized roadway-network information; a stereo-image information storage medium (CD-ROM) 5 for storing stereo-image information of stereo-display elements (e.g., multi-leveled crossings, guiding targets, topographic features and etc. on a road map), consisting of right-viewpoint and left-viewpoint images; a storage medium reader 6 for selectively reading roadway-network information and stereo-image information for a specified district from the storage media 4 and 5; a display control unit 7 for stereoscopically displaying a road map on a stereo-image display 8 on the basis of the read-out roadway network information and stereo-image information and renewably displaying a mark that indicates the running direction of the vehicle at its current position on the road map and moves thereon as the vehicle moves; and an operation unit for providing the arithmetic and control unit 3 (CPU) with operation commands including commands for selecting a desired road map to be presented on the display 8, setting a starting point and a target point of the vehicle on the road map, indicating travel trace, changing settings for the display, e.g., enlargement of a part of the map, indication of the travel trace and a magnification factor of the entire screen image.

It is, of course, possible to directly determine the current position of the vehicle on the road map by using the GPS electronic navigation system instead of the cumulative arithmetic method for determining X- and Y-coordinates of the vehicle from the detected signals of the vehicle running distance and direction.

Figure 2:
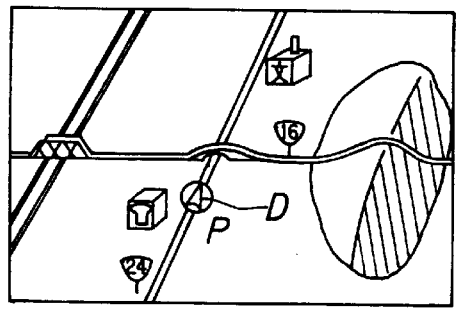
FIG. 2 is a view showing an example of display screen image of the embodiment of FIG. 1.
Figure 3:
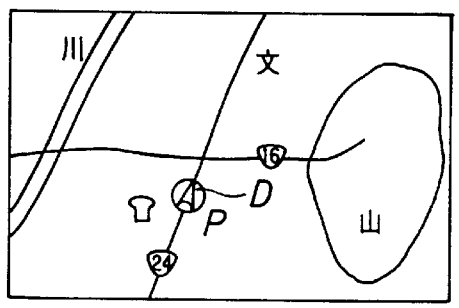
FIG. 3 shows an example of a display screen image of a conventional current-position displaying device for use in a vehicle.

The display control unit 7, on the basis of image information consisting of right-viewpoint and left-viewpoint images of stereo-display elements such as multi-leveled crossings, guide objects, topographic features, controls the display 8 to present a roadway network image and the stereo-images of the stereo-display elements as overlaid on each other on the display screen, for example, as shown in FIG. 2.

Figure 4:
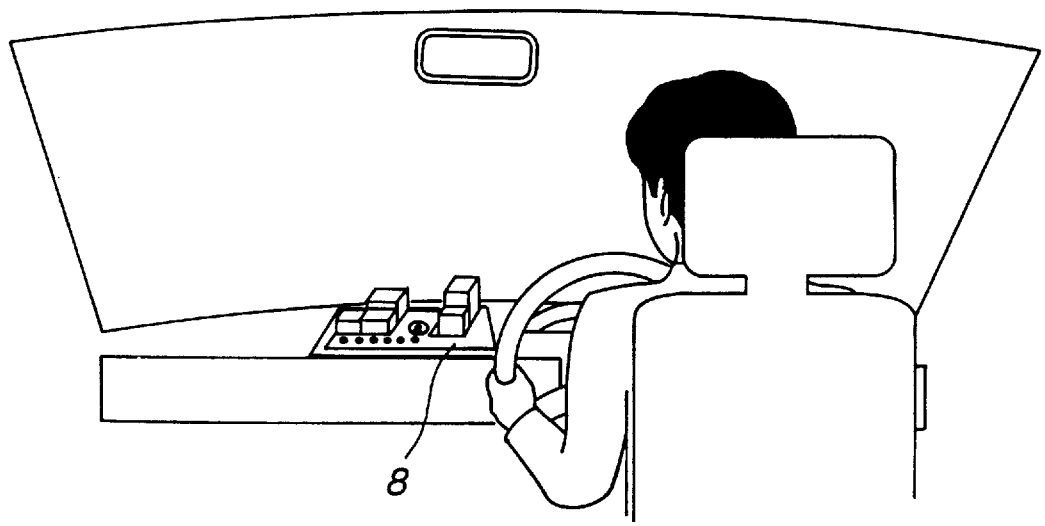
FIG. 4 illustrates a stereoscopic display which is mounted with its screen disposed in a substantially horizontal plane relative to a driver's eyes.

The display 8 can be installed with its screen disposed in a substantially horizontal plane relative to driver's eyes as shown in FIG. 4.

The display 8 for stereo-image comprises a display screen, e.g., a liquid crystal display (LCD) for displaying a left-viewpoint image and a right-viewpoint image by alternately arranging vertical strips of pixels, a lenticular lens system or a parallax barrier disposed in front of the screen to separate a displayed image into a left-viewpoint image and a right-viewpoint image, through which the driver can observe the stereoscopic image by viewing the separated left-viewpoint image and right-viewpoint image by his left eye and right eye respectively.

Figures 6, 7:
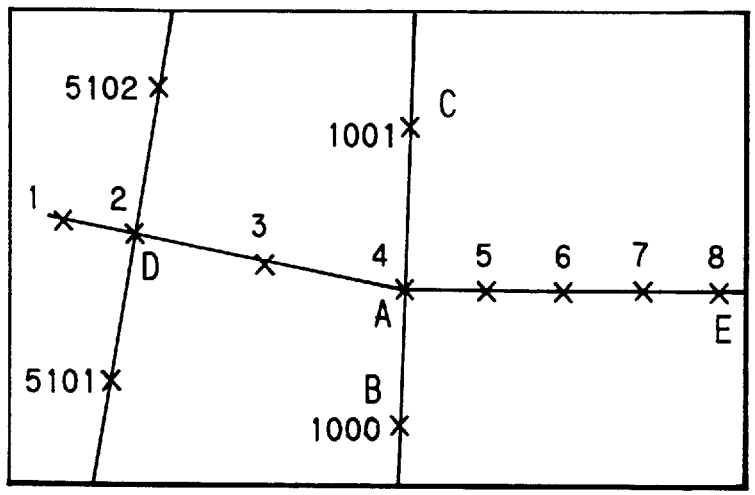
FIG. 6 is a constitutive view of a road map corresponding to the display screen image shown in FIG. 2.
FIG. 7 shows a table of constitutive data of the road map of FIG. 6.

FIG. 6 is a constitutive view of a road map corresponding to the road map shown in FIG. 2. In FIG. 6, characters A–E indicate stereo-display elements.

FIG. 7 shows a table of data for constitution of the road map of FIG. 6, and FIG. 8 shows a table of data for the stereo-display elements shown in FIG. 6.

Figure 9:
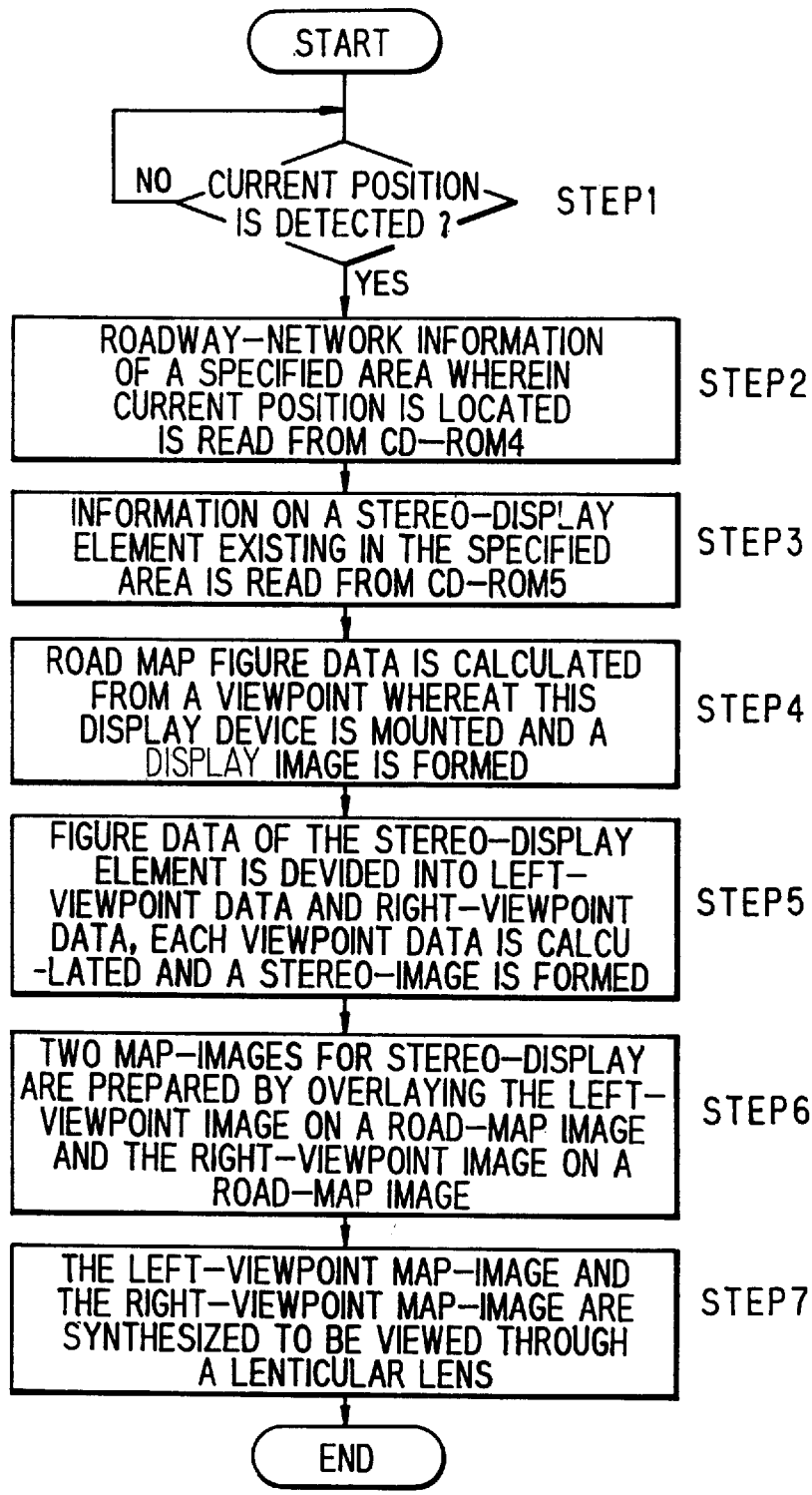
FIG. 9 is a flow chart of processing operations for preparing a display image by the displaying device of FIG. 1.

FIG. 9 is an exemplified flow chart showing a practical sequence of processing operations in the arithmetic and control unit 3 and the display control unit 7.

When a current position of the vehicle is detected (Step 1), information on the roadway network in a specified area wherein the vehicle's current position is detected is read from the roadway-network information storage medium CD-ROM 4 (Step 2). Information on stereo-display elements existing in the roadway network of the specified area is read from the stereo-image information storage medium CD-ROM 5 (Step 3), then figures of the road map are calculated from a viewpoint which is the current mounting position of the display device, and a display image is formed (Step 4). The figures of the stereo-display elements viewed from the viewpoint are divided into a left-viewpoint image and a right-viewpoint image with due consideration of parallax and the two images are respectively calculated to form display images of stereo-display elements (Step 5). A map image for the left eye is prepared by overlaying the left-viewpoint image of the stereo-display elements on the previously formed road-map image and a map image for the right eye is prepared by overlying the right-viewpoint image of the stereo-display elements on the previously formed road-map image (Step 6). The map images for left eye and right eye are then synthesized into a map image to be observed through a lenticular lens (Step 7). Forming the road map image to be stereoscopically displayed on the display screen 8 is now finished.

Figure 10:
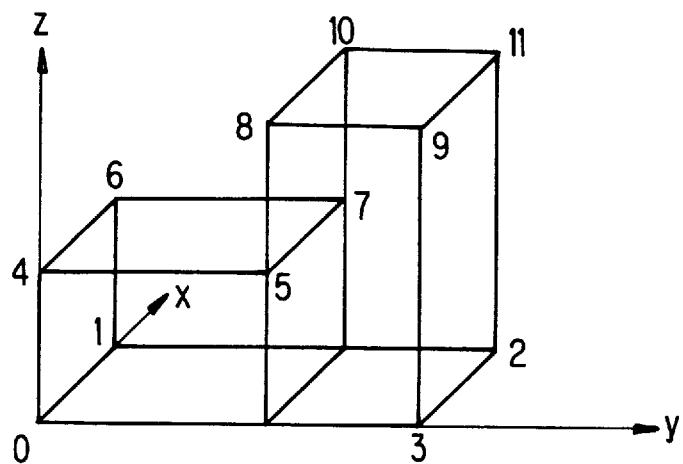
FIG. 10 is a constitutive illustration of a target building to be stereoscopically displayed.

FIG. 10 showing a constitutive view of an objective building which is an example of a stereo-display element. The objective building is composed of cubes each of which is represented by vectors (b0–b11) from the origin of its three-dimensional coordinates system (x-, y- and z-axes) to respective vertex points (0–11). Vectors are expressed as coordinate values of x-, y- and z-axes of corresponding points. For example, vector b0 is denoted by (0, 0, 0) of a corresponding vertex at which said vector points. Vector b1 is denoted by (4, 0, 0), vector b4 by (0, 0, 4) and vector b11 by (4, 14, 7).

For displaying the objective building, the vectors data are converted to those of the building image viewed from a selected viewpoint (to be expressed by rotation angles θ, φ, ϕ on x-axis, y-axis and z-axis respectively) according to the following equation for coordinate transformation:

$$A = B \cdot Q(\theta, \phi, \varphi)$$

In this equation, A is a matrix of vectors obtained by transforming a matrix B of the standard vectors (b0–b11) of the objective building according to a transform matrix Q (θ, φ, ϕ) using the viewpoint conversion data (θ, φ, ϕ).

Figure 11:
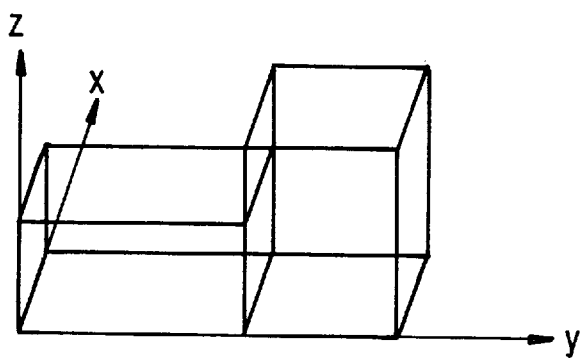
FIG. 11 shows a display image of a target building, which has been converted in relation to a viewpoint.

FIG. 11 illustrates an example of a display image of the objective building which coordinates were converted according to the selected viewpoint.

In this embodiment, two-dimensional image information on roadway networks and stereo-image information on stereo-display elements (multi-leveled crossings, guiding objects, topographic features) are separately stored from each other, the two-dimensional information and the stereo-image information of the same district are separately read-out and displayed together with the latter on the former on the display screen to stereoscopically indicate a multi-leveled crossing, bridge, building, mountain and river on a roadway network presented on the display screen.

Accordingly, this embodiment requires only specified stereo-display elements (e.g., multi-leveled crossings, guiding objects, topographic features), not all elements of a road map, to be prepared and separately stored as stereo-image information consisting of a left-viewpoint image and a right-viewpoint image. This makes it easier for preparation of information for presenting a stereoscopic road map image.

Although the above-described embodiment uses two separate storage media 4 for storing roadway network information and 5 for storing stereo-image information, it is, of-course, possible to store these two-kinds of information in separate areas in the same storage medium (CD-ROM).

In the above-described embodiment, the arithmetic and control unit 3 can easily find out a current position of the vehicle on a road map indicated on the display screen since the roadway network is represented by two-dimensional digital data and can be treated in the same way as any conventional method. This embodiment may be also provided with an altitude sensor (not shown) for detecting an altitude of the ground whereon the vehicle is running to determine a current location of the vehicle in a three-dimensional coordinate system (including Z-axis representing height level besides X- and Y-axes) on the basis of the detected altitude signal by the arithmetic and control unit 3 and adaptively indicate the current location of the vehicle on the stereo-display 8. This is effective to drive the vehicle on a mountain roadway.

Figure 5:
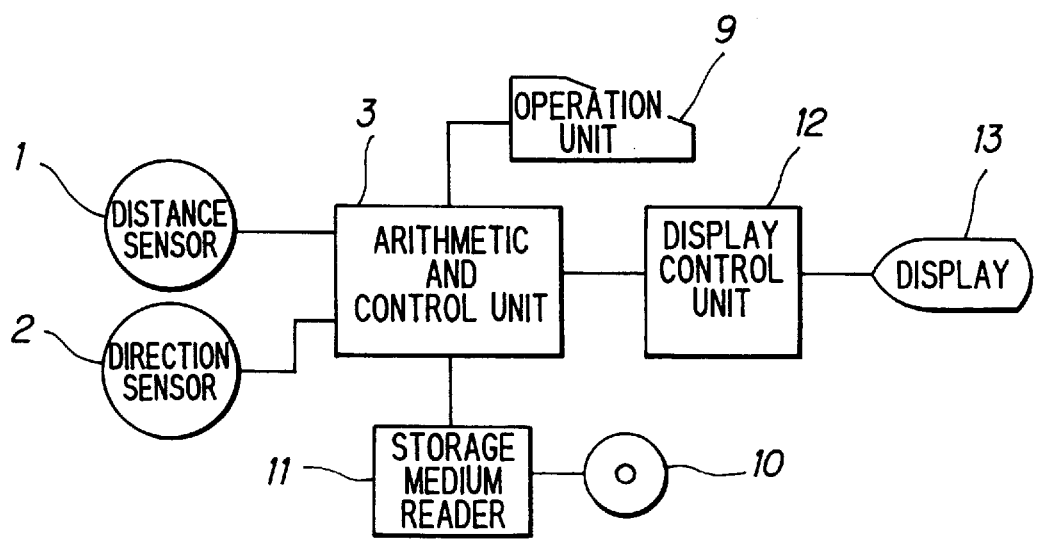
FIG. 5 is a block construction diagram of a vehicle current-position displaying device which is another embodiment of the present invention.

FIG. 5 shows another example of a vehicle current-position displaying device according to the present invention, which comprises a distance sensor 1 for detecting a running distance of the vehicle; a direction sensor 2 for detecting a running direction of the vehicle; an arithmetic and control unit 3 for determining a current position of the vehicle to be indicated on a road map on a display screen by sequentially calculating X- and Y-coordinates of current vehicle position per unit running distance from the start point on the basis of a detected running distance and a detected variation of the running direction and for conducting the control of the entire system; a map information storing medium (CD-ROM) 10 for previously storing digitized road-map information; a storage medium reader 11 for selectively reading road map information of a specified area from the road-map information storage medium 10; a display control unit 12 for displaying the specified area road map on a screen of a display 13 on the basis of the read-out map information and for renewably indicating a mark that represents the vehicle current-position and running direction thereat on the road map indicated on the display screen and is movable as the vehicle moves; and an operation unit 9 for giving the arithmetic and control unit (CPU) 3 operation commands including commands for selecting a desired road map to be presented by the display 13, setting a starting point and a target point of the vehicle on the road map, selecting desired display functions such as changing the magnification factor of the display screen image, indicating a travel trace and turning the road map indicated on the screen.

The current-position displaying device thus constructed previously stores map information including information on roadway networks and information on three-dimensional figures of stereo-display elements (multi-leveled crossings, guiding objects, topographic features) in the map information storage medium 10, reads the map information and operates the display control unit 12 to display, on the display 13, a road map wherein three-dimensional figures of a multi-leveled crossing, guiding objects (bridge and building) and topographic features (mountain and river) are indicated at respective specified positions together with a mark P for indicating the present position of the vehicle and a mark D indicating the running direction of the vehicle at the current position as shown in FIG. 2.

FIG. 12 shows an exemplified sequence of practical data processing operations by the arithmetic and control unit 3 and the display control unit 1.

When a current position of the vehicle is detected (Step 1), information on the roadway network in a specified area wherein the vehicle's current position is detected is read from the road-map information storage medium CD-ROM 10 (Step 2). Information on stereo-display elements existing in the road map of the specified area is read from the road-map information storage medium CD-ROM 10 (Step 3). Then, figures of the road map are calculated from the currently set viewpoint and a display image is formed (Step 4). Figures of stereo-display elements are calculated from the currently set viewpoint and a display image is formed (Step 5). The display image of the stereo-display elements is overlaid on the prepared road map (Step 6), whereby a road map image to be displayed on a display screen 13 is completed.

The map information consisting of two kinds of information, i.e., roadway networks information and stereo-display elements information (e.g., multi-leveled crossings, guiding targets and topographic features) may be prepared either in a completely edited form and stored in the map-information storage medium or in a separately edited form in which two kinds of information are separately edited with due positional correlation therebetween and stored separately in specially reserved areas of the storage medium (or in two separate CD-ROMs).

In the latter case that roadway-network information and the stereo-image information on stereo-display elements such as multi-leveled crossings, guiding objects and topographic features are separately stored and two kinds of information for a specified area are separately read therefrom and displayed as overlaid on each other on the display screen, it is possible to to separately modify only the necessary items of roadway-networks information or stereo-display elements information, i.e., with no need of rewriting entire map information. The information may be easily corrected or modified if the need be. In addition, the roadway-network image and three-dimensional figures of stereo-display elements can be separately turned around the axis as the vehicle runs ahead so that the running direction of the vehicle can be marked always upward in the road map indicated on the display screen during the time of driving the vehicle. This makes it easier to perform data-processing necessary for turning the road map.

According to the present invention, it is possible to display a multi-leveled crossing, guiding objects (bridge, building), topographic features (mountain, river) in the form of three-dimensional figures on two-dimensional image of a roadway-network image on the basis of the roadway-network information and three-dimensional figure information of the stereo-display elements on the road map. The road-map image wherein the current position is renewably presented may thus match with an actual road situation.

It is also possible to provide an altitude sensor (not shown) for detecting an altitude of the ground whereon the vehicle is running, determine a current location of the vehicle in a three-dimensional coordinate system (including Z-axis representing height level besides X- and Y-axes) on the basis of the detected altitude signal by the arithmetic and control unit 3 and adaptively indicate the current position of the vehicle on the stereo-display 13. This is effective to drive the vehicle on a mountain roadway.

As is apparent from the foregoing, a vehicle current-position displaying device according to the present invention has means for stereoscopically displaying a road map on a stereo-image display screen, using map image information consisting of left-viewpoint images and right-viewpoint images, and can stereoscopically present the road map for indicating therein a current position of the vehicle, which matches with the actual roadway situation and allows a driver to easily grasp where the vehicle is running.

The vehicle current-position displaying device according to the present invention has means for displaying three-dimensional figures of stereo-display elements at specified positions on a roadway network indicated on a display screen on the basis of map information consisting of roadway-network information with added thereto information on three-dimensional figures of stereo-display elements such as multi-leveled crossings, guiding objects and topographic features, and can generate a road map for indicating thereon a current position of the vehicle, which matches with an actual road situation and allows a driver to easily grasp where the vehicle is running.

What is claimed is:

1. A vehicle current-position displaying device for searching and displaying a current position of the vehicle on a road map indicated on a display screen according to road map information, comprising, means for stereoscopically displaying the road map on a stereo-display screen by using road map information consisting of roadway-network information and stereo-image information, said stereo-image information consisting of a right viewpoint image and a left viewpoint image of three-dimensional stereo-display elements on the road map, said roadway-network information and said stereo-image information being separately stored in at least one of either a storage medium or separate storage media; said road map information of said roadway-network information in a district and said stereo-image information in said district are separately read from the storage medium or media; and means for displaying a road map image of the roadway-network image and the stereo-image of the stereo-display elements by displaying one over the other on the stereo-display screen.

2. A vehicle current-position displaying device as defined in claim 1, characterized in that the stereo-display screen comprises a screen on which respective vertical strips of pixels of a right viewpoint image and a left viewpoint image are projected alternately and sequentially, and a lenticular lens is disposed on the front surface of the screen for separately displaying the left-viewpoint image and right-viewpoint image of the image projected on the screen.

3. A vehicle current-position displaying device as defined in claim 1, characterized in that the stereo-display screen comprises a screen on which respective vertical strips of pixels of a right viewpoint image and a left viewpoint image are projected alternately and sequentially, and a parallax barrier is disposed on the front surface of the screen for separately displaying the left-viewpoint image and right-viewpoint image of the image projected on the screen.

4. A vehicle current-position displaying device for searching and displaying a current position of the vehicle on a road map indicated on a display screen according to road map information, characterized in that the device is provided with means for displaying respective three-dimensional figures of stereo-display elements at respective specified points in a roadway-network indicated on the display screen using, as the road map information, roadway-network information of the roadway network with added thereto separate stereo-image information of the three-dimensional figures of the stereo-display elements.

5. A vehicle current-position displaying device for searching and displaying a current position of the vehicle on a road map indicated on a display screen according to stored road map information, an improvement comprising three-dimensional figure information stored separately from the road map information in a medium and correlated to the stored road map information, and means for displaying respective three-dimensional figures from said medium at respective specified points on the road map on the display screen.

* * * * *